Aug. 25, 1964  T. R. PAUL  3,146,364
DYNAMO-ELECTRIC MACHINE COMMUTATOR CONSTRUCTION
Filed July 20, 1962

INVENTOR.
THEODORE R. PAUL
BY George Raynovich Jr.
AGENT

United States Patent Office 3,146,364
Patented Aug. 25, 1964

3,146,364
DYNAMO-ELECTRIC MACHINE COMMUTATOR
CONSTRUCTION
Theodore R. Paul, 114 Woodland Road, Pittsburgh, Pa.
Filed July 20, 1962, Ser. No. 211,351
3 Claims. (Cl. 310—236)

This invention relates to electrical equipment, and more particularly to an improved commutator for the armature of a dynamo together with the method of assembling the improved commutator.

Commutators for electrical armatures conventionally consist of a plurality of individual commutator bars arranged around a central core or spider. The individual bars are electrically connected to the respective coils of the armature and are electrically insulated from each other by means of sheets of insulating material disposed between the bars. The individual bars are usually formed having recessed portions in each end. When the commutator is assembled, the recessed portions co-operate to form annular grooves in the ends of the commutator. Clamping rings of metal are then inserted in the grooves to clamp the commutator bars to each other. The clamping rings must, of course, be electrically insulated from the commutator bars.

Several disadvantages occur from the use of this conventional commutator construction. It is difficult to insulate the clamping ring from the commutator. The clamping ring may be inserted with excessive force, thereby bending the commutator bars. When the commutator wears and it is desired to dress it by machining a portion from the brush-contacting surface of the commutator, extreme care must be exercised not to structurally weaken the bars in the vicinity of the clamping rings.

The present invention is directed to a novel commutator assembly in which the individual commutator bars are formed with one or more clamping surfaces that extend in parallel relation to the brush contacting surface of the bar. Thus, when the bars are assembled onto the commutator, the clamping surfaces of the individual bars combine to form segmented cylindrical clamping surfaces for the commutator. These segmented clamping surfaces have as their axes the axis of the commutator and are thus, generally concentric with the brush contacting surface of the commutator.

Once the commutator has been assembled so that the segmented clamping surface is formed, a clamping means is placed over the clamping surface in electrically insulated relation to the commutator. The clamping means can take many forms, however, in the preferred embodiment of this invention, the clamping means is formed by wrapping successive layers of a resin-impregnated fibrous tape over the commutator clamping surface. After being so wrapped the resin is cured so that the roving of the tape and the resin are bonded together into a dense, homogeneous mass by the hardened resin. This dense mass, then forms a ring around the commutator clamping surface that retains the commutator bars in place on the commutator and resists any movement of the bars that might result from the centrifugal force to which the bars are subjected as the commutator rotates.

The present invention also contemplates the method of assembly of the novel commutator in which the bars are first assembled on the commutator and are there temporarily retained by the use of a temporary retaining jig or are temporarily tied by wrapping light wire around the brush contacting surface. The permanent clamping means is then positioned over the clamping surface and fixed in place, as by curing the resin in the case of the taped clamp, whereupon the temporary retaining means is removed.

With the foregoing considerations in mind it is a primary object of the present invention to provide an improved armature commutator for a dynamo.

Another object of this invention is to provide a commutator which is readily assembled and which will give long, trouble-free service.

Another object of this invention is to provide an improved method of assembling a commutator.

These and other objects of this invention will become apparent as this description proceeds in conjunction with the accompanying drawings.

Figure 1:
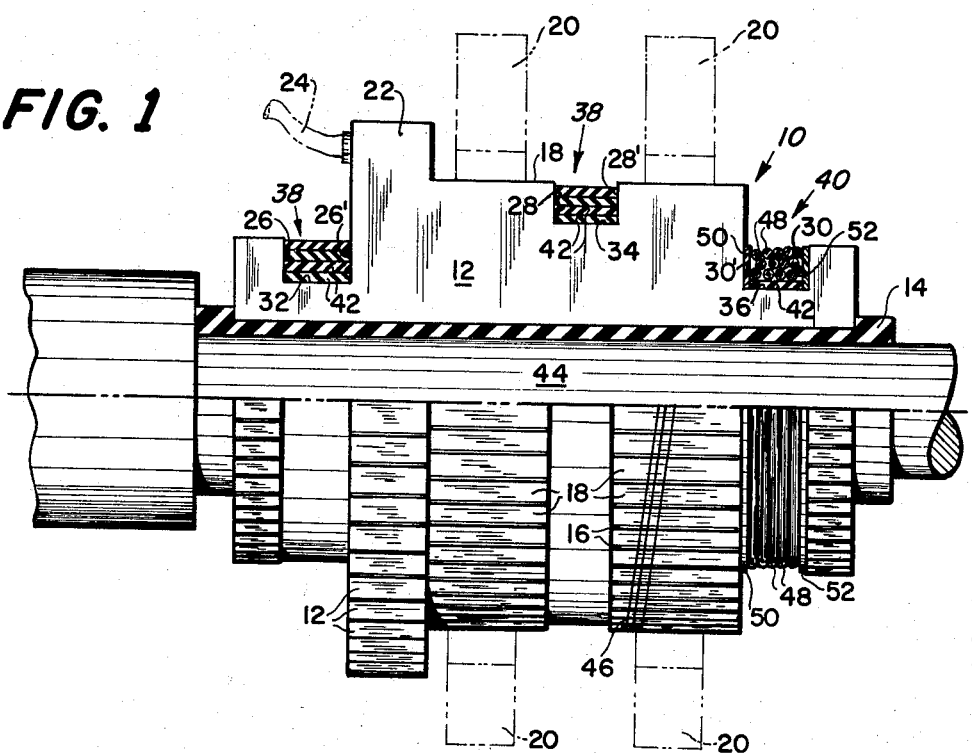
FIGURE 1 is a partial sectional elevation of the improved commutator of this invention taken along line 1—1 of FIGURE 2.

Referring to the drawings, a commutator 10 is formed from a plurality of identical commutator bars 12 that are disposed about the periphery of an insulating sleeve 14. The insulating sleeve may be formed of a single piece of insulating material, or it may be built up of successive wraps of resin-impregnated tape as will hereinafter be more fully described. The individual commutator bars 12 are electrically insulated from each other by thin sheets 16 of insulating material such as mica or the like.

Figure 2:
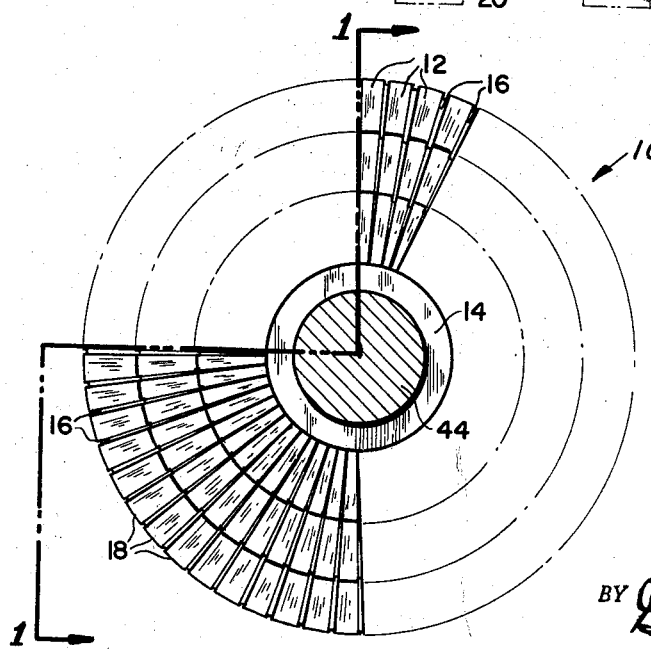
FIGURE 2 is an end elevation of the commutator of FIGURE 1.

Each of the commutator bars 12 is generally wedge shaped in cross section, as may be clearly seen in FIGURE 2, so that the plurality of bars forms a closed circle about the periphery of the commutator when the bars 12 are positioned in side by side relation with the relatively thin sheets 16 of insulating material between them.

As is best seen in FIGURE 1, each of the bars has a brush-contacting surface 18 over which the dynamo brushes 20 (shown in phantom lines) ride. Also formed on each of the bars 12 is a radially extending lead connection 22 which joins to the leads 24 from the armature coils. Each commutator bar 12 has three slots formed therein as shown at 26, 28, and 30. Formed at the bottom of each slot in parallel relation to the brush-contacting surface 18 of each bar 12 are clamping surfaces 32, 34, and 36. Thus, the bottom of slot 26 is formed by clamping surface 32, the bottom of slot 28 is formed by clamping surface 34, and the bottom of slot 30 is formed by clamping surface 36.

When the individual commutator bars are disposed about insulating sleeve 14, the individual brush-contacting surfaces 18 of each bar 12 co-operate to form a segmented cylindrical brush-contacting surface for the entire commutator 10, likewise, individual slots 26, 28, and 30 formed in each bar 12 co-operate to form outwardly facing annular grooves 26′, 28′, and 30′ around the entire commutator. The bottom of annular groove 26′ is a segmented, cylindrical clamping surface forward from the individual clamping surface 32 of each bar 12. In a similar manner, the bottom of groove 28′ is a clamping surface formed from the individual clamping surfaces 34 and the bottom of groove 30′ is a clamping surface formed from the individual clamping surfaces 36.

The grooves 26′ and 30′ are formed axially outwardly of the brush-contacting surface 18 of the commutator bars, whereas, the groove 28′ is formed in the brush-contacting surface. It should be understood that not all commutators will have three clamping means, or even two clamping means, but, that the number and position of the individual clamping means on the commutator will be determined by, among other factors, the size and shape of the commutator, the overall weight of the commutator, and the rotational speed of the commutator.

The clamping means 38 is the preferred type of clamping means. In clamping means 38, a fiberous tape 42 is wrapped around the clamping surface of the commutator within the respective grooves 26' or 28' or 30' until the grooves are substantially filled with the tape 42. In the case of groove 28' formed in the brush-contacting surface, the tape 42 does not quite fill the groove so that it will not extend radially beyond the brush-contacting surface.

Tape 42 is preferably of the type disclosed in my United States Patent No. 2,949,555 entitled "Banding or Binding Electrical Rotors or Armatures" and issued on August 16, 1960. The tape is formed of roving having high tensile strength that is formed of fiber glass or other non-conducting fibers such as those sold under the trade names "nylon" and "Dacron."

Roves or webbing formed of such fibers which are arranged in generally parallel relation with one another are impregnated with a thermo-setting resin and maintained in a pliable condition so that tape 42 may be wound on the commutator. The resin in the fibers is then cured or hardened so that the roving of non-conductive fibers is bonded into a dense, homogeneous mass by the hardened resin. The individual layers of tape 42 then lose their identity as such and become part of homogeneous rigid ring having strength that very nearly approaches that of a steel ring.

The resin of the tape 42 may be cured or hardened in various ways as is discussed in my aforesaid Patent 2,949,555. For example, heat may be supplied thereto from heat lamps, or the commutator 10 can be preheated, or the commutator 10 may be baked after the tape has been applied. Some resins can be cured at room temperature, through the use of a catalyzer.

The clamping means 38, then, consists only of a plurality of wraps of resin-impregnated tape 42 which has been cured to form a hardened ring around the commutator segmented clamping surface.

As mentioned previously, the insulating sleeve 14 may be formed of a solid piece of insulating material, or it may be built up by the use of several wraps of tape 42 covering the surface of armature shaft 44. If the insulating sleeve 14 is formed of tape 42, the tape is cured before the commutator bars are positioned thereon.

To assemble a commutator utilizing the clamping means 38, the sleeve 14 is first non-rotatably positioned on armature shaft 44 and cured if formed of tape 42. The individual commutator bars 12, separated by the sheets 16 of insulating material, are then positioned about the periphery of sleeve 14 as shown in the drawings. A light wire 46 is then wrapped over the brush-contacting suface of the commutator 10 to temporarily retain the bars 12 in position. The tape 42 is then wrapped tightly over the segmented clamping surface of the commutator in multiple wraps. After the tape 42 has been positioned, the resin in the tape is cured to harden the tape into a homogeneous mass thereby forming a ring extending around the clamping surface. The temporary retaining means of light wire 46 is then removed.

When it is found useful or necessary to form the commutator of the present invention with a clamping means in the brush-contacting surface as is shown in groove 28', it is preferable to utilize the type of clamping means designated 38 since this type does not interfere with dressing of the brush-contacting surface. If it becomes necessary to dress the brush-contacting surface by machining the surface and undercutting the sheets 16 of insulating material, the cutting tool can easily cut the hardened resin and roving of the hardened ring of tape 42 as the commutator is being machined. In most instances the hardened ring of tape 42 will still be of sufficient strength to retain the commutator bars 12.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. Armature commutator for a dynamo comprising:
   (a) a plurality of identical commutator bars each having a brush-contacting surface extending parallel to the axis of said commutator and each having at least one clamping surface, said individual commutator bar clamping suhfaces extending in a circle when said commutator bars are arranged to form the outer portion of said commutator, said commutator bars being electrically insulated from each other and being arranged about the periphery of said commutator so that said brush-contacting surfaces together form a segmented cylindrical commutator brush-contacting surface and so that said circularly extending clamping surfaces together form a segmented cylindrical commutator clamping surface, and
   (b) clamping means electrically insulated from said commutator bars and clampingly surrounding said segmented cylindrical clamping surface to bind said commutator bars together and retain them in place as a part of said commutator, said clamping means including an annular band of tape-like material composed of a roving of non-conductive fibers concentrically arranged in successive layers and bonded into a rigid, dense homogeneous mass by a hardened resin, said clamping means being the only means maintaining said commutator in an assembled condition.

2. The commutator of claim 1 wherein said clamping means is formed of only an annular band of tape-like material composed of a roving of nonconductive fibers concentrically arranged in successive layers and bonded into a rigid, dense homogeneous mass by a hardened resin.

3. An armature commutator for a dynamo comprising:
   (a) a plurality of identical commutator bars each having a brush-contacting surface extending parallel to the axis of said commutator and each having at least one slot formed therein, said commutator bars being electrically insulated from each other and being arranged about the periphery of said commutator so that said brush-contacting surfaces form a segmented cylindrical brush-contacting surface and so that said slots form at least one outwardly opening annular groove in the outer surface of said commutator, and
   (b) at least one annular band of tape-like material composed of a roving of non-conductive fibers concentrically arranged in successive layers and bonded into a rigid, dense homogeneous mass by a hardened resin, said rigid band of tape-like material being disposed within each of said outwardly opening annular grooves of said commutator and serving to clamp said commutator bars radially inwardly to resist the outward movement of said bars due to centrifugal force as said commutator rotates, said annular bands of tape-like material being the only means of maintaining said commutator in an assembled condition.

References Cited in the file of this patent
UNITED STATES PATENTS

| | | |
|---|---|---|
| 1,075,502 | Scott | Oct. 14, 1913 |
| 2,747,119 | Petersen et al. | May 22, 1956 |
| 2,896,100 | Axelson | July 21, 1959 |
| 3,047,756 | Coggeshall | July 31, 1962 |

FOREIGN PATENTS

| | | |
|---|---|---|
| 940,719 | Germany | Mar. 22, 1956 |